US010288036B2

(12) United States Patent
Liu et al.

(10) Patent No.: US 10,288,036 B2
(45) Date of Patent: May 14, 2019

(54) ROTOR

(71) Applicant: TERAL INC., Fukuyama-shi, Hiroshima (JP)

(72) Inventors: Hao Liu, Narashino (JP); Takeo Fujii, Fukuyama (JP); Ryosuke Yoshimura, Akishima (JP)

(73) Assignee: TERAL INC., Fukuyama-shi (JP)

( * ) Notice: Subject to any disclaimer, the term of this patent is extended or adjusted under 35 U.S.C. 154(b) by 294 days.

(21) Appl. No.: 15/310,533

(22) PCT Filed: Nov. 24, 2015

(86) PCT No.: PCT/JP2015/005837
§ 371 (c)(1),
(2) Date: Nov. 11, 2016

(87) PCT Pub. No.: WO2016/103572
PCT Pub. Date: Jun. 30, 2016

(65) Prior Publication Data
US 2017/0089322 A1    Mar. 30, 2017

(30) Foreign Application Priority Data

Dec. 25, 2014   (JP) ................................. 2014-261641

(51) Int. Cl.
*F03D 1/06*       (2006.01)
*F03B 3/04*       (2006.01)
(Continued)

(52) U.S. Cl.
CPC .............. *F03D 1/0641* (2013.01); *F03B 3/04* (2013.01); *F03B 3/12* (2013.01); *F03B 3/121* (2013.01);
(Continued)

(58) Field of Classification Search
CPC .......... F03D 1/0641; F03D 80/00; F03D 1/06; F03D 1/0608; F03D 1/0666;
(Continued)

(56) References Cited

U.S. PATENT DOCUMENTS 632,740 A  *  9/1899  Parker ................... B64C 27/463
                                                    416/228
5,326,225 A  *  7/1994  Gallivan ............... F04D 29/164
                                                    416/169 A
(Continued)

FOREIGN PATENT DOCUMENTS

EP          1577562 A2    9/2005
JP       2004137910 A     5/2004
(Continued)

OTHER PUBLICATIONS

Mar. 13, 2018, Notification of Reasons for Refusal issued by the Japan Patent Office in the corresponding Japanese Patent Application No. 2014-261641.

(Continued)

*Primary Examiner* — Eldon T Brockman
(74) *Attorney, Agent, or Firm* — Kenja IP Law PC

(57) ABSTRACT

The stability of power generation efficiency against variation of fluid speed and direction can be improved. The disclosed rotor 1 for a wind or water power machine includes a hub 10, supported by a main shaft, and blades 20, each having a root end 21 connected to the hub. In a projection plane perpendicular to a rotational center axis O of the rotor, a leading edge 31 of the blade has leading edge bulge portions 36 and 37 protruding forward in the rotor rotational direction only at two different locations in the rotor radial direction.

4 Claims, 3 Drawing Sheets

(51) Int. Cl.
*F03B 3/12* (2006.01)
*F03D 80/00* (2016.01)

(52) U.S. Cl.
CPC .............. *F03D 1/06* (2013.01); *F03D 80/00* (2016.05); *F05B 2210/16* (2013.01); *F05B 2240/301* (2013.01); *Y02E 10/223* (2013.01); *Y02E 10/721* (2013.01); *Y02E 10/722* (2013.01)

(58) Field of Classification Search
CPC ...... F03D 1/0675; F03D 1/0683; F03B 3/121; F03B 3/04; F03B 3/12; F05B 2210/16; F05B 2240/301; Y02E 10/223; Y02E 10/721; Y02E 10/722
See application file for complete search history.

(56) References Cited

U.S. PATENT DOCUMENTS

| | | | | |
|---|---|---|---|---|
| 7,044,712 | B2* | 5/2006 | Cho | F04D 29/384 416/169 A |
| 7,121,807 | B2* | 10/2006 | Cho | F04D 29/384 416/242 |
| 7,585,155 | B2* | 9/2009 | Park | F04D 29/326 416/189 |
| 2004/0175269 | A1* | 9/2004 | Cho | F04D 29/384 415/220 |
| 2008/0273981 | A1 | 11/2008 | Ito et al. | |
| 2009/0074578 | A1 | 3/2009 | Dewar et al. | |
| 2011/0293432 | A1* | 12/2011 | Hibbard | F03D 1/0675 416/223 R |
| 2014/0205452 | A1 | 7/2014 | Perkinson | |

FOREIGN PATENT DOCUMENTS

| | | |
|---|---|---|
| JP | 2006152864 A | 6/2006 |
| JP | 3875618 B2 | 1/2007 |
| JP | 2014231759 A | 12/2014 |
| WO | 2013120946 A1 | 8/2013 |
| WO | 2016021555 A1 | 2/2016 |

OTHER PUBLICATIONS

Jul. 10, 2018, Office Action issued by Canadian Intellectual Property Office in the corresponding Canadian Patent Application No. 2951217.

Jul. 2, 2018, Office Action issued by the State Intellectual Property Office in the corresponding Chinese Patent Application No. 201580025528.7.

Feb. 16, 2016, International Search Report issued in the International Patent Application No. PCT/JP2015/005837.

Jun. 27, 2017, International Preliminary Report on Patentability issued in the International Patent Application No. PCT/JP2015/005837.

Nov. 30, 2017, Extended European Search Report issued by the European Patent Office in the corresponding European Patent Application No. 15872150.6.

Nov. 23, 2017, Office Action issued by the Taiwan Intellectual Property Office in the corresponding Taiwanese Patent Application No. 105114830.

Jan. 3, 2019, Office Action issued by the Canadian Intellectual Property Office in the corresponding Canadian Patent Application No. 2951217.

* cited by examiner

ROTOR

TECHNICAL FIELD

This disclosure relates to a rotor for a wind or water power machine including a hub, supported by a main shaft, and blades, each having a root end connected to the hub.

BACKGROUND

Conventional rotors for a wind or water power machine include a rotor in which, in a projection plane perpendicular to a rotational center axis of the rotor, each leading edge of the blades protrudes forward in a rotor rotational direction relative to a first line segment connecting an inward end and an outward end in the rotor radial direction of the leading edge (for example, PTL 1).

CITATION LIST

Patent Literature

PTL 1: Japanese Patent Application No. 2013-112137

SUMMARY

Technical Problem

In some places where a wind or water power machine provided with a rotor is installed, it is anticipated that the fluid speed and direction relative to the rotor may vary greatly on a continuous basis. However, even in such an installation place, it is desirable that sufficient power generation efficiency can be stably obtained. In general, if a sufficiently favorable power coefficient of a wind or water power machine is obtained with respect to a wider range of tip speed ratio, it can be said that the stability of power generation efficiency against variation of fluid speed and direction is higher.

However, in the conventional rotor, the stability of power generation efficiency against variation of fluid speed and direction has not been sufficiently optimized, and there has been room for improvement.

Therefore, this disclosure was devised in order to provide a rotor for a wind or water power machine with an improved stability of power generation efficiency against variation of fluid speed and direction.

Solution to Problem

The summarized configuration of this disclosure which aims to achieve the above purpose is explained below.

The disclosed rotor is a rotor for a wind or water power machine, the rotor comprising a hub, supported by a main shaft, and a blade, having a root end connected to the hub, wherein, in a projection plane perpendicular to a rotational center axis of the rotor, a leading edge of the blade has leading edge bulge portions only at two different locations in a rotor radial direction, the leading edge bulge portions each protrudes in a bulge shape forward in a rotor rotational direction.

According to the disclosed rotor, the stability of power generation efficiency against variation of fluid speed and direction can be improved.

According to the disclosed rotor, in the projection plane, it is preferable that when a tangent line of the hub at a central point in a rotor circumferential direction of the root end of the blade is defined as a first virtual line VL1, and when a virtual line that is parallel to the first virtual line VL1 and is located on an opposite side of the hub by a distance of 0.50 times a length of the blade BL from the first virtual line VL1 is defined as a second virtual line VL2, the leading edge of the blade has a protrusion tip of one of the leading edge bulge portions located inward in the rotor radial direction relative to the second virtual line VL2 and a protrusion tip of the other leading edge bulge portion located outward in the rotor radial direction relative to the second virtual line VL2.

According to this configuration, the stability of power generation efficiency against variation of fluid speed and direction can be further improved.

Furthermore, according to the disclosed rotor, in the projection plane, it is preferable that when virtual lines that are parallel to the first virtual line VL1 and are located on the opposite side of the hub by distances of 0.25 times, 0.75 times and 1.00 times the length of the blade BL from the first virtual line VL1 are defined as a third virtual line VL3, a fourth virtual line VL4 and a fifth virtual line VL5, respectively, a width BW1 of the blade along the first virtual line VL1, a width BW2 of the blade along the second virtual line VL2, a width BW3 of the blade along the third virtual line VL3, a width BW4 of the blade along the fourth virtual line VL4 and a width BW5 of the blade along the fifth virtual line VL5 satisfy inequalities of:

BW1<BW3, and

BW3>BW2>BW4>BW5.

According to this configuration, the stability of power generation efficiency against variation of fluid speed and direction can be further improved.

Moreover, according to the disclosed rotor, in the projection plane, it is preferable that a protrusion tip of the leading edge bulge portion located more inward in the rotor radial direction, out of the two leading edge bulge portions, is located forward in the rotor rotational direction with respect to a first line segment L1 connecting an inward end in the rotor radial direction of the leading edge of the blade and a protrusion tip of the leading edge bulge portion located more outward in the rotor radial direction, out of the two leading edge bulge portions.

According to this configuration, a power coefficient when a tip speed ratio is relatively low can be further improved.

Furthermore, according to the disclosed rotor, in the projection plane, it is preferable that a protrusion tip of the leading edge bulge portion located more outward in the rotor radial direction, out of the two leading edge bulge portions, is located forward in the rotor rotational direction with respect to a second line segment L2 connecting a protrusion tip of the leading edge bulge portion located more inward in the rotor radial direction, out of the two leading edge bulge portions, and an outward end in the rotor radial direction of the leading edge of the blade.

According to this configuration, a power coefficient when a tip speed ratio is relatively high can be further improved.

According to the disclosed rotor, in the projection plane, it is preferable that a trailing edge of the blade intersects with a third line segment L3 at one point, the third line segment L3 connecting an inward end and an outward end in the rotor radial direction of the trailing edge of the blade, a portion of the trailing edge of the blade located inward in the rotor radial direction relative to an intersection of the trailing edge of the blade and the third line segment L3 is located rearward in the rotor rotational direction relative to the third line segment L3, and a portion of the trailing edge of the blade located outward in the rotor radial direction relative to the intersection of the trailing edge of the blade and the third line segment L3 is located forward in the rotor rotational direction relative to the third line segment L3.

According to this configuration, the stability of power generation efficiency against variation of fluid speed and direction can be further improved.

Advantageous Effect

According to this disclosure, a rotor for a wind or water power machine having an improved stability of power generation efficiency against variation of fluid speed and direction can be provided.

DETAILED DESCRIPTION

An embodiment of this disclosure will be exemplified in detail below with reference to the drawings.

Figure 1:
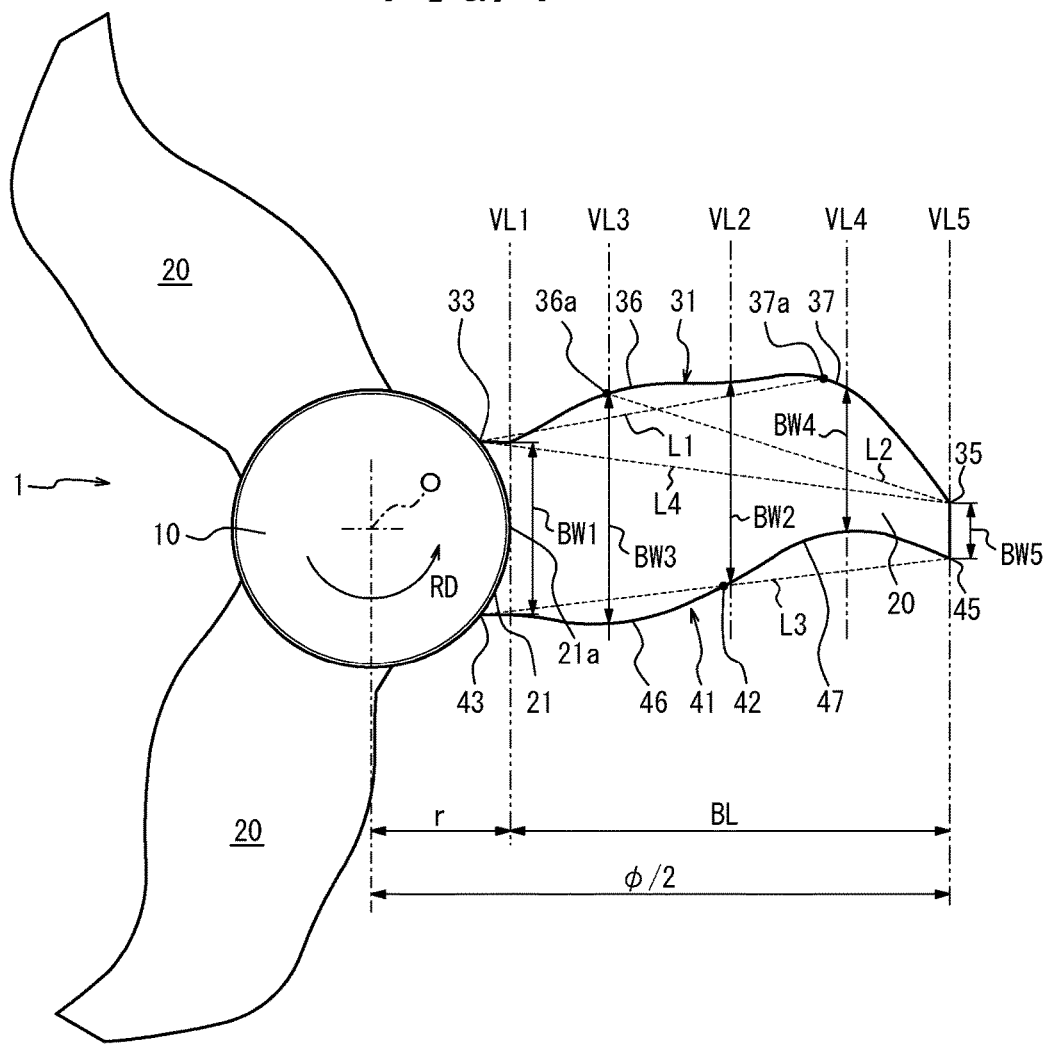
FIG. 1 is a front view illustrating one embodiment of a rotor according to this disclosure.
Figure 2:
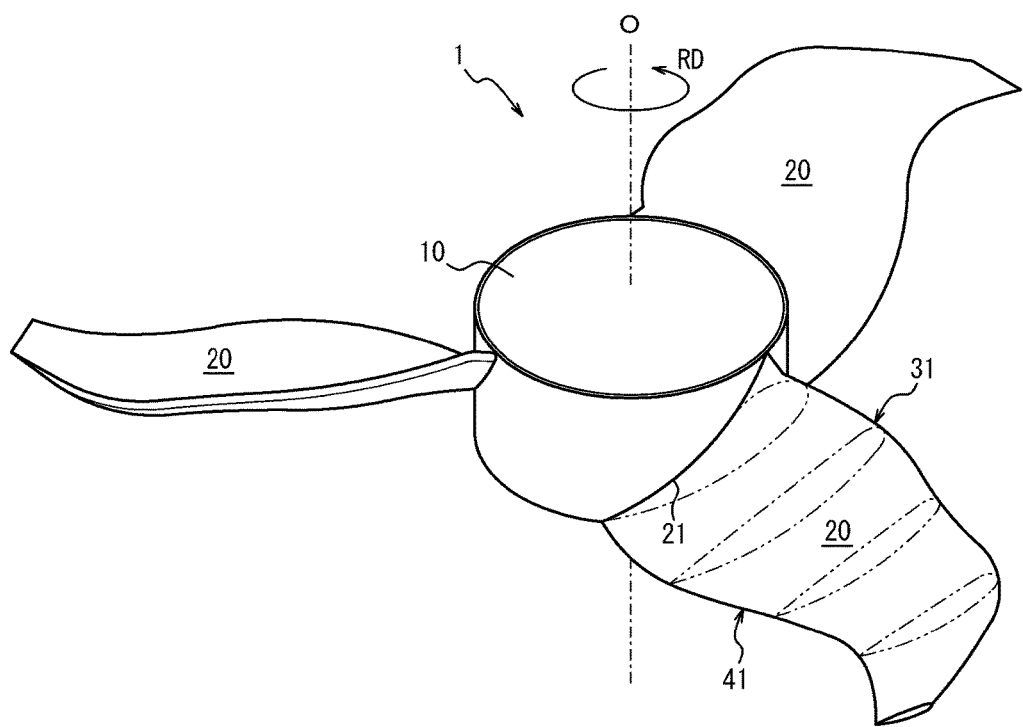
FIG. 2 is a perspective view of the rotor illustrated in FIG. 1.

One embodiment of this disclosure will be described with reference to FIGS. 1 to 3. FIG. 1 is a front view of one embodiment of the disclosed rotor. FIG. 2 is a perspective view of the rotor 1 illustrated in FIG. 1. The rotor 1 of this embodiment is used for a wind or water power machine, and more particularly, in this example, it is used for a wind power generator.

It should be noted that the "wind or water power machine" according to this disclosure refers to a machine that uses motive power obtained from wind power or water power, such as a wind power generator (wind turbine, or the like) or a water power generator (water turbine, or the like).

The rotor 1 according to this embodiment can be used not only for a wind power generator, but also for a water power generator or other wind or water power machines.

The rotor 1 according to this embodiment preferably has a diameter Φ of 741 to 1111 mm, for example, and in the illustrated example, the diameter Φ of the rotor 1 is 926 mm.

The rotor 1 according to this embodiment includes a hub 10 supported by a main shaft (not illustrated) and three blades 20 each having a root end 21 connected to the hub 10. When viewing FIG. 1, the main shaft, not illustrated, extends rearward from the back side of the hub 10, and in this example, it is disposed horizontally, and the central axis of the main shaft is a rotational center axis O of the rotor 1.

It should be noted that the number of blades 20 is not limited to three, and it can be any number.

Furthermore, although each blade 20 of the rotor 1 has the same shape in this example, some of the blades may have a shape that is different from the other blades.

According to this embodiment, in the projection plane perpendicular to the rotational center axis O of the rotor 1 (that is, in the plane of FIG. 1), the leading edge 31 of the blade 20 has leading edge bulge portions 36 and 37, each of which protrudes in a bulge shape forward in a rotational direction RD of the rotor, only at two different locations in the rotor radial direction.

Here, with respect to the leading edge bulge portions 36 and 37, "protrudes in a bulge shape" forward in the rotor rotational direction refers to that the leading edge bulge portions 36 and 37 in the above projection plane are each formed into a shape like a Gaussian curve, a triangular shape or the like that has a protrusion tip with retracted portions on both sides thereof, and not a shape like an inclined line, a proportional curve or the like that has a protrusion tip with a retracted portion on only one side thereof.

It should be noted that, in this example, each protrusion tip of the leading edge bulge portions 36 and 37 in the above projection plane is formed into a rounded curve, which is preferable in terms of reduction in the air resistance, thus improvement of power generation efficiency. However, each protrusion tip of the leading edge bulge portions 36 and 37 in the above projection plane may be formed into a sharp pointed shape.

Since the leading edge 31 of the blade 20 has a first leading edge bulge portion 36 located more inward in the rotor radial direction, out of the two leading edge bulge portions 36, 37, the power coefficient of the wind power generator when the tip speed ratio is relatively low can be sufficiently favorable. On the other hand, since the leading edge 31 of the blade 20 has a second leading edge bulge portion 37 located more outward in the rotor radial direction, out of the two leading edge bulge portions 36, 37, the power coefficient of the wind power generator when the tip speed ratio is relatively high can be sufficiently favorable. Therefore, according to this embodiment, as compared with the case where the leading edge 31 has only one leading edge bulge portion, for example, sufficiently favorable power coefficient of the wind power generator can be obtained with respect to a wider range of tip speed ratio, and as a result, stability of power generation efficiency against variation of wind speed and direction can be improved.

Here, the "tip speed ratio" is the ratio of the blade tip speed (the rotational-direction speed of the blade at its outward end in the rotor radial direction) relative to the wind speed. When the tip speed ratio is defined as λ, the wind speed is defined as U (m/s), the rotational speed of the rotor is defined as N (rpm), and the diameter of the rotor is defined as Φ (mm), the tip speed ratio can be represented by λ=ΦN/(2U).

Furthermore, the "power coefficient" is the ratio of the net power of the wind power generator relative to the kinetic energy of free air flow passing through the wind receiving area of the rotor per unit time.

With respect to the example of FIG. 1, in the projection plane perpendicular to the rotational center axis O of the rotor 1, when a tangent line of the hub 10 at the central point 21a in the rotor circumferential direction of the root end 21 of the blade 20 is defined as a first virtual line VL1, and when a virtual line that is parallel to the first virtual line VL1 and is located on the opposite side of the hub 10 by a distance of 0.50 times the length BL of the blade 20 (0.50 BL) from the first virtual line VL1 is defined as a second virtual line VL2, the leading edge 31 of the blade 20 has a protrusion tip 36a of the first leading edge bulge portion 36 (one of the leading edge bulge portions) inward in the rotor radial direction relative to the second virtual line VL2, and has a protrusion tip 37a of the second leading edge bulge portion 37 (the other leading edge bulge portion) outward in the rotor radial direction relative to the second virtual line VL2.

According to this configuration, compared with the case where both of the protrusion tip 36a of the first leading edge bulge portion 36 and the protrusion tip 37a of the second leading edge bulge portion 37 are located on the same side relative to the second virtual line VL2, for example, the locations in the rotor radial direction of the first leading edge bulge portion 36 and the second leading edge bulge portion 37 are distributed more favorably within the leading edge 31 of the blade 20, and as a result, sufficiently favorable power coefficient of the wind power generator can be obtained with respect to a wider range of the tip speed ratio. Thus, the stability of power generation efficiency against variation of wind speed and direction can be further improved.

Here, the "protrusion tip" of the leading edge bulge portion refers to the tip of the bulge shape possessed by the leading edge bulge portion. The "length BL of the blade 20" refers to the length $((\Phi/2)-r)$ obtained by subtracting the radius r of the hub 10 from the radius ($\Phi/2$) of the rotor 10. Furthermore, the "radius ($\Phi/2$) of the rotor 10" refers to the distance from the rotational center axis O of the hub 10 (therefore the rotational center axis O of the rotor 1) to the outer most end in the rotor radial direction of the blade 20. It should be noted that, in the projection plane perpendicular to the rotational center axis O of the rotor 1, when the hub 10 is not formed in a circular shape, the "radius r of the hub 10" refers to the circumradius of the hub 10 in the projection plane.

In this example, the length BL of the blade 20 is 349 mm, and the radius r of the hub 10 is 114 mm.

With respect to the example illustrated in FIG. 1, in the above projection plane, the leading edge 31 of the blade 20 has the protrusion tip 36a of the first leading edge bulge portion 36 between the first virtual line VL1 and the second virtual line VL2.

With respect to the rotor 1 of the example illustrated in FIG. 1, in the projection plane perpendicular to the rotational center axis O of the rotor 1, when the virtual lines that are parallel to the first virtual line VL1 and are located on the opposite side of the hub 10 by distances 0.25 times, 0.75 times and 1.00 times the length of the blade 20, BL, from the first virtual line VL1 are defined as a third virtual line VL3, a fourth virtual line VL4, and a fifth virtual line VL5, respectively, the width BW1 of the blade 20 along the first virtual line VL1, the width BW2 of the blade 20 along the second virtual line VL2, the width BW3 of the blade 20 along the third virtual line VL3, the width BW4 of the blade 20 along the fourth virtual line VL4 and the width BW5 of the blade 20 along the fifth virtual line VL5 satisfy the following inequalities (1) and (2):

$$BW1<BW3 \qquad (1)$$

$$BW3>BW2>BW4>BW5 \qquad (2)$$

When above inequalities (1) and (2) are satisfied, as compared with the case where there is a gradual decrease in the width of the blade 20, measured in parallel with the first virtual line VL1, from the first virtual line VL1 toward the fifth virtual line VL5, (i.e. when BW1>BW3>BW2>BW4>BW5 is satisfied), for example, the stability of power generation efficiency against variation of wind speed and direction can be further improved.

Moreover, with respect to the rotor 1 of the example illustrated in FIG. 1, in the projection plane perpendicular to the rotational center axis O of the rotor 1, the width BW1 of the blade 20 along the first virtual line VL1 and the width BW5 of the blade 20 along the fifth virtual line VL5 satisfy the following inequality (3):

$$BW1>BW5 \qquad (3)$$

With respect to the rotor 1 of the example illustrated in FIG. 1, in the projection plane perpendicular to the rotational center axis O of the rotor 1, the width BW1 of the blade 20 along the first virtual line VL1, the width BW2 of the blade 20 along the second virtual line VL2 and the width BW4 of the blade 20 along the fourth virtual line VL4 satisfy the following inequality (4):

$$BW4<BW1<BW2 \qquad (4)$$

With respect to the rotor 1 of the example illustrated in FIG. 1, in the projection plane perpendicular to the rotational center axis O of the rotor 1, the protrusion tip 36a of the first leading edge bulge portion 36 located more inward in the rotor radial direction, out of the leading edge bulge portions 36 and 37, is located forward in the rotational direction RD of the rotor with respect to a first line segment L1, connecting the inward end 33 in the rotor radial direction of the leading edge 31 of the blade 20 and the protrusion tip 37a of the second leading edge bulge portion 37 located more outward in the rotor radial direction, out of the leading edge bulge portions 36 and 37.

According to this configuration, compared with the case where the protrusion tip 36a of the first leading edge bulge portion 36 is located rearward in the rotor rotational direction RD with respect to the first line segment L1, for example, the power coefficient when the tip speed ratio is relatively low (e.g. when the tip speed ratio is 0.926) can be further improved.

Furthermore, with respect to the rotor 1 of the example illustrated in FIG. 1, in the projection plane perpendicular to the rotational center axis O of the rotor 1, the protrusion tip 37a of the second leading edge bulge portion 37 located more outward in the rotor radial direction, out of the two leading edge bulge portions 36 and 37, is located forward in the rotational direction RD of the rotor with respect to a second line segment L2, connecting the protrusion tip 36a of the first leading edge bulge portion 36 located more inward in the rotor radial direction, out of the two leading edge bulge portions 36 and 37, and the outward end 35 in the rotor radial direction of the leading edge 31 of the blade 20.

According to this configuration, compared with the case where the protrusion tip 37a of the second leading edge bulge portion 37 is located rearward in the rotational direction RD of the rotor with respect to the second line segment L2, for example, the power coefficient when the tip speed ratio is relatively high (e.g. when the tip speed ratio is 5.56) can be further improved.

Moreover, with respect to the rotor 1 of the example illustrated in FIG. 1, in the projection plane perpendicular to the rotational center axis O of the rotor 1, a trailing edge 41 of the blade 20 intersects with a third line segment L3 at one point. The third line segment L3 connects an inward end 43 and an outward end 45 in the rotor radial direction of the trailing edge 41 of the blade 20. A portion 46 of the trailing edge 41 of the blade 20 located inward in the rotor radial direction relative to the intersection 42 of the trailing edge 41 and the third line segment L3 is located rearward in the rotational direction RD of the rotor relative to the third line segment L3. Further, a portion 47 of the trailing edge 41 of the blade 20 located outward in the rotor radial direction relative to the intersection 42 of the trailing edge 41 and the third line segment L3 is located forward in the rotor rotational direction relative to the third line segment L3.

According to this configuration, compared with the case where the entire trailing edge 41 of the blade 20 is linear in the projection plane, for example, the stability of power generation efficiency against variation of fluid speed and direction can be further improved.

Furthermore, with respect to the rotor 1 of the example illustrated in FIG. 1, in the projection plane perpendicular to the rotational center axis O of the rotor 1, the protrusion tips 36a and 37a of both of the leading edge bulge portions 36 and 37 are located forward in the rotor rotational direction with respect to a fourth line segment L4, connecting the inward end 33 and the outward end 35 in the rotor radial direction of the leading edge 31 of the blade 20.

According to this configuration, compared with the case where the entire leading edge 31 of the blade 20 is linear in the above projection plane, for example, the stability of power generation efficiency against variation of fluid speed and direction can be further improved.

In the example illustrated in FIG. 1, the entire leading edge 31 of the blade 20 is located forward in the rotational direction RD of the rotor relative to the fourth line segment L4.

According to this configuration, compared with the case where the entire leading edge 31 of the blade 20 is linear, for example, the stability of power generation efficiency against variation of fluid speed and direction can be further improved.

Furthermore, with respect to this example, in the projection plane perpendicular to the rotational center axis O of the rotor 1, although both of the outward end 35 in the rotor radial direction of the leading edge 31 and the outward end 45 in the rotor radial direction of the trailing edge 41 are located on the fifth virtual line VL5, the outward end 35 in the rotor radial direction of the leading edge 31 or the outward end 45 in the rotor radial direction of the trailing edge 41 may be located on the side of the hub 10 relative to the fifth virtual line VL5.

As illustrated in FIG. 2, in this example, the thickness of the blade 20 is gradually decreased from the root end 21 of the blade 20 toward the outward end in the rotor radial direction of the blade 20. As a result, the stability of power generation efficiency against variation of fluid speed and direction can be further improved.

In this specification, the "thickness of the blade 20" refers to the largest thickness of the blade 20 measured, in an arbitral virtual plane parallel to a virtual plane, which includes the first virtual line VL1 and is parallel to the rotational center axis O of the rotor 1, perpendicularly to a virtual line, which intersects with the leading edge 31 and the trailing edge 41 of the blade 20.

Moreover, as illustrated in FIG. 2, in this example, the pitch angle (also called "twist angle") of the blade 20 is gradually decreased from the root end 21 of the blade 20 toward the outward end in the rotor radial direction of the blade 20. As a result, the stability of power generation efficiency against variation of fluid speed and direction can be further improved.

In this specification, the "pitch angle" is an acute angle, in an arbitral virtual plane parallel to a virtual plane which includes the first virtual line VL1 and is parallel to the rotational center axis O of the rotor 1, formed by a virtual line, which intersects with the leading edge 31 and the trailing edge 41 of the blade 20, and an intersection line of the aforementioned arbitral plane and a virtual plane perpendicular to the rotational center axis O of the rotor 1.

It should be noted that the pitch angle in a virtual plane, which includes the first virtual line VL1 and is parallel to the rotational center axis O of the rotor 1, is preferably from 36.2° to 40.0°, and in this example, it is 38.1°.

Furthermore, the pitch angle in a virtual plane, which includes the fifth virtual line VL5 and is parallel to the rotational center axis O of the rotor 1, is preferably from 7.13° to 7.89°, and in this example, it is 7.51°.

Figure 3:
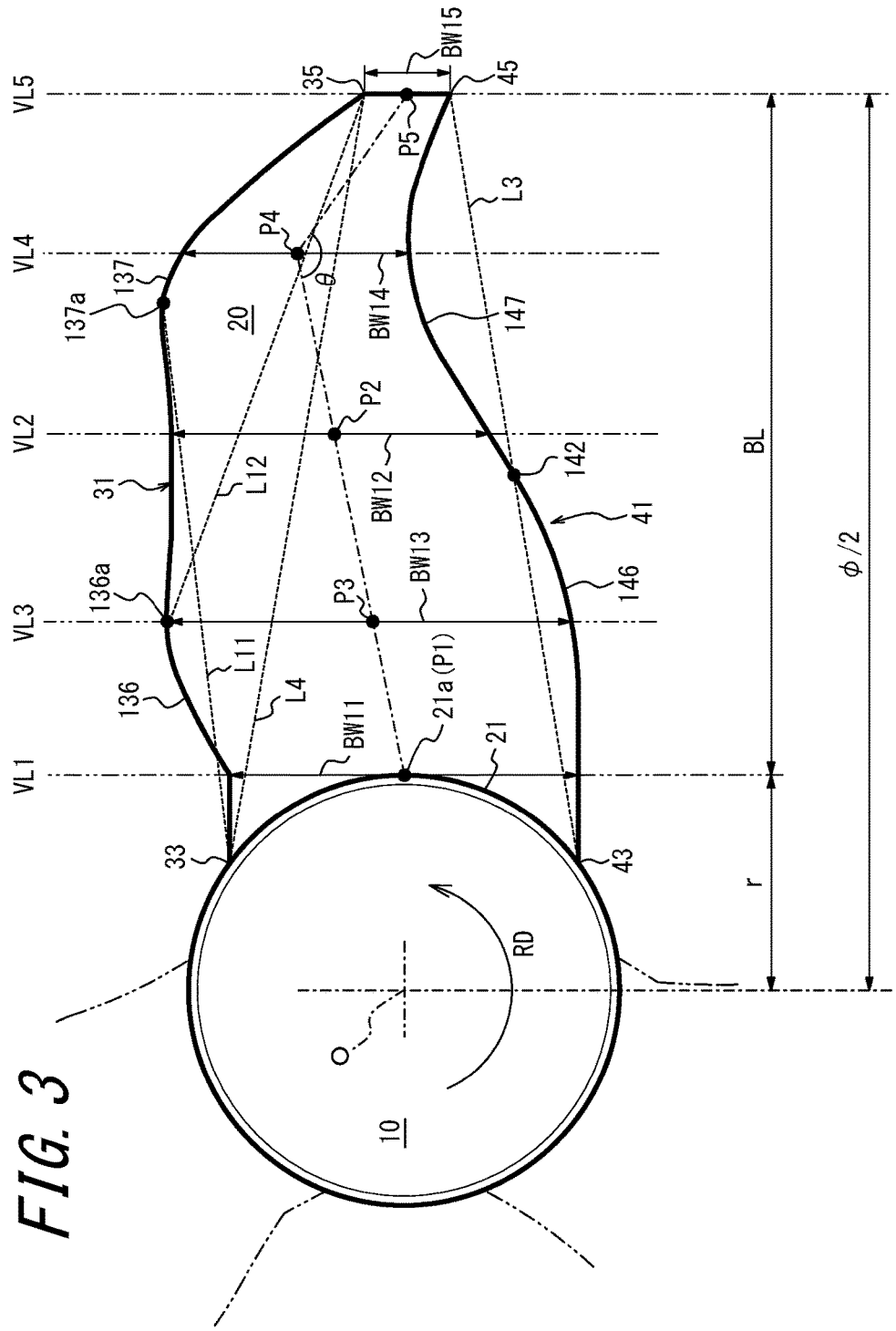
FIG. 3 illustrates a blade illustrated in FIG. 1 by developing the blade in a direction perpendicular to a rotational center axis of the rotor.

FIG. 3 is a diagram of the blade 20 illustrated in FIG. 1 developed in the direction perpendicular to the rotational center axis O of the rotor 1. That is, FIG. 3 illustrates a state where the pitch angle of the blade 20 is set to 0° over the entire length of the blade 20.

With respect to this example, in the development diagram of FIG. 3, the leading edge 31 of the blade 20 has leading edge bulge portions 136 and 137 each protruding in a bulge shape forward in the rotational direction RD of the rotor only at two different locations in the rotor radial direction.

Furthermore, with respect to this example, in the development diagram of FIG. 3, the leading edge 31 of the blade 20 has a protrusion tip 136a of the first leading edge bulge portion 136 located inward in the rotor radial direction relative to the second virtual line VL2 (more specifically, between the first virtual line VL1 and the second virtual line VL2), and has a protrusion tip 137a of the second leading edge bulge portion 137 located outward in the rotor radial direction relative to the second virtual line VL2.

With respect to the rotor 1 of this example, in the development diagram of FIG. 3, a width BW11 of the blade 20 along the first virtual line VL1, a width BW12 of the blade along the second virtual line VL2, a width BW13 of the blade along the third virtual line VL3, a width BW14 of the blade along the fourth virtual line VL4 and a width BW15 of the blade along the fifth virtual line VL5 satisfy the following inequalities (5) and (6):

$$BW11 < BW13 \qquad (5)$$

$$BW13 > BW12 > BW14 > BW15 \qquad (6)$$

Moreover, with respect to this example, in the development diagram of FIG. 3, the width BW11 of the blade 20 along the first virtual line VL1 and the width BW15 of the blade 20 along the fifth virtual line VL5 satisfy the following inequality (7):

$$BW11 > BW15 \qquad (7)$$

With respect to this example, in the development diagram of FIG. 3, the width BW11 of the blade 20 along the first virtual line VL1 and the width BW12 of the blade 20 along the second virtual line VL2 satisfy the following inequality (8):

$$BW12 < BW11 \qquad (8)$$

Furthermore, with respect to the rotor 1 of this example, in the development diagram of FIG. 3, the protrusion tip 136a of the first leading edge bulge portion 136 located more inward in the rotor radial direction, out of the two leading edge bulge portions 136 and 137, is located forward in the rotational direction RD of the rotor with respect to a first line segment L11, connecting the inward end 33 in the rotor radial direction of the leading edge 31 of the blade 20 and the protrusion tip 137a of the second leading edge bulge portion 137 located more outward in the rotor radial direction, out of the two leading edge bulge portions 136 and 137.

With respect to the rotor 1 of this example, in the development diagram of FIG. 3, the protrusion tip 137a of the second leading edge bulge portion 137 located more outward in the rotor radial direction, out of the two leading edge bulge portions 136 and 137, is located forward in the rotational direction RD of the rotor with respect to a second line segment L12, connecting the protrusion tip 136a of the first leading edge bulge portion 136 located more inward in the rotor radial direction, out of the two leading edge bulge portions 136 and 137, and the outward end 35 in the rotor radial direction of the leading edge 31 of the blade 20.

Furthermore, with respect to the rotor 1 of this example, in the development diagram of FIG. 3, the trailing edge 41 of the blade 20 intersects with a third line segment L3 at one point. The third line segment L3 connects the inward end 43 and the outward end 45 in the rotor radial direction of the trailing edge 41 of the blade 20. A portion 146 of the trailing edge 41 of the blade 20 located inward in the rotor radial direction relative to the intersection 142 of the trailing edge 41 and the third line segment L3 is located rearward in the rotational direction RD of the rotor relative to the third line segment L3. Further, a portion 147 of the trailing edge 41 of the blade 20 located outward in the rotor radial direction relative to the intersection 142 of the trailing edge 41 and the third line segment L3 is located forward in the rotational direction RD of the rotor relative to the third line segment L3.

Moreover, with respect to the rotor 1 of this example, in the development diagram of FIG. 3, the protrusion tips 136a and 137a of both of the leading edge bulge portions 136 and 137 are located forward in the rotor rotational direction with respect to a fourth line segment L4, connecting the inward end 33 and the outward end 35 in the rotor radial direction of the leading edge 31 of the blade 20.

With respect to the rotor 1 of this example, in the development diagram of FIG. 3, the entire leading edge 31 of the blade 20 is located forward in the rotational direction RD of the rotor relative to the fourth line segment L4.

With respect to the rotor 1 of this example, in the developed view of FIG. 3, when the points located at equal distance from the leading edge 31 and the trailing edge 41 of the blade 20, on the first virtual line VL1, the second virtual line VL2, the third virtual line VL3, the fourth virtual line VL4 and the fifth virtual line VL5, respectively, are defined as a first central point P1, a second central point P2, a third central point P3, a fourth central point P4 and a fifth central point P5, respectively, the second central point P2 and the third central point P3 are located on a line segment connecting the first central point P1 and the fourth central point P4. Furthermore, in this example, the angle θ formed by a line segment connecting the first central point P1 and the fourth central point P4 and a line segment connecting the fourth central point P4 and the fifth central point P5 is 133°.

With this configuration, the stability of power generation efficiency against variation of fluid speed and direction can be further improved.

It should be noted that the above angle θ may be any other values, and is preferably from 120° to 146°.

With respect to the example of FIG. 3, in its developed view, the first central point P1 overlaps the central point 21a in the rotor circumferential direction of the root end 21 of the blade 20.

EXAMPLES

The performance of the rotors of Comparative Examples 1 to 4 and of the rotor of Example 1 according to this disclosure were evaluated by analysis. Each rotor of Comparative Examples 1 to 4 and of Example 1 was different only in the blade shape. All of these rotors had a rotor diameter Φ of 926 mm, a blade length BL of 349 mm, a hub radius r of 114 mm and three blades.

With respect to the rotor of Comparative Example 1, the leading edge and the trailing edge of each blade were linear over the entire length of the blades.

With respect to each rotor of Comparative Examples 2 to 4, the leading edge and the trailing edge of each blade were curved to be convex forward in the rotor rotational direction at a position of the third virtual line VL3, the second virtual line VL2 and the fourth virtual line VL4, respectively.

The rotor of Example 1 had a blade shape as illustrated in the aforementioned example of FIGS. 1 to 3.

Other details of each rotor are shown in Table 1.

In Table 1, the "blade width central line" refers to a virtual line formed by connecting the first central point P1, the third central point P3, the second central point P2, the fourth central point P4 and the fifth central point P5 of the blade in this order by line segments. The wordings "bent at 0.25BL," "bent at 0.50BL" and "bent at 0.75BL" mean that the above blade width central line is bent at the third central point P3, the second central point P2 and the fourth central point P4, respectively.

TABLE 1

| | Blade width central line | θ [°] | Number of leading edge bulge portions | Power coefficient | | |
| --- | --- | --- | --- | --- | --- | --- |
| | | | | λ = 0.926 | λ = 2.78 | λ = 5.56 |
| Comparative Example 1 | Linear | 180 | 0 | 0.090 | 0.388 | 0.147 |
| Comparative Example 2 | Bent at 0.25 BL | 133 | 1 | 0.120 | 0.389 | 0.159 |
| Comparative Example 3 | Bent at 0.50 BL | 142 | 1 | 0.092 | 0.389 | 0.170 |
| Comparative Example 4 | Bent at 0.75 BL | 133 | 1 | 0.088 | 0.396 | 0.202 |
| Example 1 | Bent at 0.75 BL | 133 | 2 | 0.106 | 0.387 | 0.263 |

As can be seen from Table 1, as compared with the rotors of Comparative Examples 1 to 4, the rotor of Example 1 showed sufficiently favorable power coefficient in all of the cases of tip speed ratio λ=0.926, λ=2.78 and λ=5.56, and thus proved to have a higher stability of power generation efficiency against variation of wind speed and direction.

It should be noted that, with the rotor of Example 1, the power coefficient was the largest (0.398) when the tip speed ratio λ=3.7.

INDUSTRIAL APPLICABILITY

The disclosed rotor can be used for a wind or water power machine that utilizes motive power obtained by wind power or water power, such as a wind power generator that employs a horizontal axis rotor, a water power generator, or the like.

REFERENCE SIGNS LIST

- 1 Rotor
- 10 Hub
- 20 Blade
- 21 Root end of blade
- 21a Central point in a rotor circumferential direction of root end of blade
- 31 Leading edge
- 33 Inward end in a rotor radial direction of leading edge
- 35 Outward end in a rotor radial direction of leading edge
- 36, 136 First leading edge bulge portion (leading edge bulge portion located more inward in a rotor radial direction)
- 36a, 136a Protrusion tip of first leading edge bulge portion
- 37. 137 Second leading edge bulge portion (leading edge bulge portion located more outward in a rotor radial direction)
- 37a. 137a Protrusion tip of second leading edge bulge portion
- 41 Trailing edge
- 42, 142 Intersection with third line segment of trailing edge
- 43 Inward end in a rotor radial direction of trailing edge
- 45 Outward end in a rotor radial direction of trailing edge
- 46, 146 Portion of trailing edge located inward in a rotor radial direction relative to an intersection with third line segment
- 47, 147 Portion of trailing edge located outward in a rotor radial direction relative to an intersection with third line segment
- O Rotational center axis of rotor
- RD Rotational direction
- r Radius of hub
- Φ Diameter of rotor
- θ Angle

The invention claimed is:

1. A rotor for a wind or water power machine, the rotor comprising a hub, supported by a main shaft, and a blade, having a root end connected to the hub, wherein, in a projection plane perpendicular to a rotational center axis of the rotor, a leading edge of the blade has leading edge bulge portions only at two different locations in a rotor radial direction, the leading edge bulge portions each protrudes in a bulge shape forward in a rotor rotational direction, wherein in the projection plane, when a tangent line of the hub at a central point in a rotor circumferential direction of the root end of the blade is defined as a first virtual line VL1, and when a virtual line that is parallel to the first virtual line VL1 and is located on an opposite side of the hub by a distance of 0.50 times a length of the blade BL from the first virtual line VL1 is defined as a second virtual line VL2, the leading edge of the blade has a protrusion tip of one of the leading edge bulge portions located inward in the rotor radial direction relative to the second virtual line VL2 and a protrusion tip of the other leading edge bulge portion located outward in the rotor radial direction relative to the second virtual line VL2, and wherein in the projection plane, when virtual lines that are parallel to the first virtual line VL1 and are located on the opposite side of the hub by distances of 0.25 times, 0.75 times and 1.00 times the length of the blade BL from the first virtual line VL1 are defined as a third virtual line VL3, a fourth virtual line VL4 and a fifth virtual line VL5, respectively, a width BW1 of the blade along the first virtual line VL1, a width BW2 of the blade along the second virtual line VL2, a width BW3 of the blade along the third virtual line VL3, a width BW4 of the blade along the fourth virtual line VL4 and a width BW5 of the blade along the fifth virtual line VL5 satisfy inequalities of:

$$BW1 < BW3, \text{ and}$$

$$BW3 > BW2 > BW4 > BW5.$$

2. The rotor according to claim 1, wherein, in the projection plane, a protrusion tip of the leading edge bulge portion located more inward in the rotor radial direction, out of the two leading edge bulge portions, is located forward in the rotor rotational direction with respect to a first line segment L1 connecting an inward end in the rotor radial direction of the leading edge of the blade and a protrusion tip of the leading edge bulge portion located more outward in the rotor radial direction, out of the two leading edge bulge portions.

3. The rotor according to claim 1, wherein, in the projection plane, a protrusion tip of the leading edge bulge portion located more outward in the rotor radial direction, out of the two leading edge bulge portions, is located forward in the rotor rotational direction with respect to a second line segment L2 connecting a protrusion tip of the leading edge bulge portion located more inward in the rotor radial direction, out of the two leading edge bulge portions, and an outward end in the rotor radial direction of the leading edge of the blade.

4. The rotor according to claim 1, wherein, in the projection plane, a trailing edge of the blade intersects with a third line segment L3 at one point, the third line segment L3 connecting an inward end and an outward end in the rotor radial direction of the trailing edge of the blade, a portion of the trailing edge of the blade located inward in the rotor radial direction relative to an intersection of the trailing edge of the blade and the third line segment L3 is located rearward in the rotor rotational direction relative to the third line segment L3, and a portion of the trailing edge of the blade located outward in the rotor radial direction relative to the intersection of the trailing edge of the blade and the third line segment L3 is located forward in the rotor rotational direction relative to the third line segment L3.

* * * * *